United States Patent [19]

Hall

[11] Patent Number: 5,188,208

[45] Date of Patent: Feb. 23, 1993

[54] BELT CONVEYOR ADVANCING AND/OR RETREATING RETURN END

[75] Inventor: Kevin Hall, Wollongong, Australia

[73] Assignee: Meco Australia Pty Limited, Australia

[21] Appl. No.: 843,989

[22] Filed: Feb. 10, 1992

[30] Foreign Application Priority Data

Feb. 13, 1991 [AU] Australia .............................. PK4584

[51] Int. Cl.⁵ .............................................. B65G 65/02
[52] U.S. Cl. .................................. 198/312; 198/861.2; 198/303; 198/313
[58] Field of Search ............... 198/303, 312, 315, 313, 198/316.1, 807, 808, 812, 861.2; 299/45, 58, 64

[56] References Cited

U.S. PATENT DOCUMENTS

| | | | |
|---|---|---|---|
| 3,621,983 | 11/1971 | Arentzen et al. | 198/313 |
| 4,312,540 | 1/1982 | Thompson | 198/313 X |
| 4,776,445 | 10/1988 | Zitz et al. | 198/303 |
| 4,784,439 | 11/1988 | Wrulich et al. | 198/303 X |
| 4,813,526 | 3/1989 | Belanger | 198/313 |

FOREIGN PATENT DOCUMENTS

| | | | |
|---|---|---|---|
| 1090573 | 10/1960 | Fed. Rep. of Germany | 198/315 |
| 0161207 | 12/1981 | Japan | 198/303 |
| 0385055 | 10/1973 | U.S.S.R. | 198/313 |
| 0896851 | 5/1962 | United Kingdom | 198/861.2 |

Primary Examiner—Robert P. Olszewski
Assistant Examiner—James R. Bidwell
Attorney, Agent, or Firm—Klarquist, Sparkman, Campbell, Leigh & Whinston

[57] ABSTRACT

A belt conveyor advancing and/or retreating return end (1) is situated between a conveyor structure (2) and an excavation implement (3). Elements (1, 2 and 3) are to be located in an underground mine (12) for example. Return end (1) comprises a main frame (4) located above a crawler frame (5). Tracks (7) are mounted to the crawler frame (5) and are mounted in a parallel configuration to laterally opposed sides of the crawler frame (5). Slewing cylinders (10) are provided such that one end of each slewing cylinder (10) is connected to the main frame (4) whereas the other end is connected to the crawler frame (5). A number of levelling cylinders (11) effect vertical movement of crawler tracks (7) relative to crawler frame (5) which in turn effects vertical movement of the main frame (4). The configuration disclosed allows lateral alignment of the belt or rotation of the belt end in a nominally horizontal plane without the necessity of moving the belt return end either forward or rearward in the longitudinal direction of the belt.

9 Claims, 7 Drawing Sheets

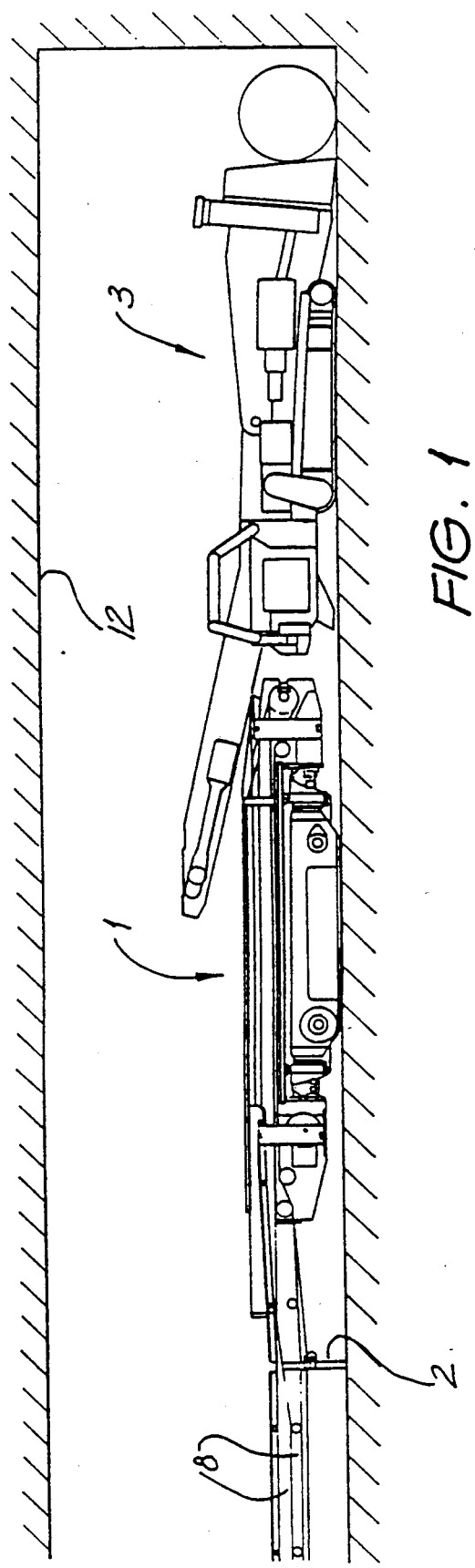
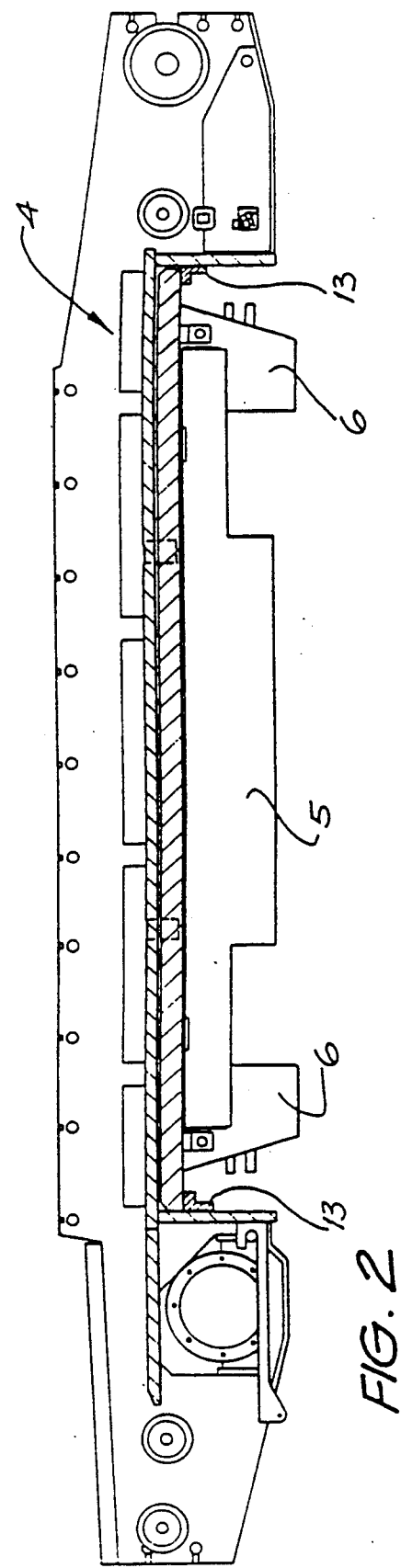

BELT CONVEYOR ADVANCING AND/OR RETREATING RETURN END

FIELD OF THE INVENTION

The following invention relates to a belt conveyor advancing and/or retreating return end. More particularly, the invention relates to such a return end having the ability to move laterally with respect to the longitudinal direction of a conveyor belt supported thereby.

PRIOR ART

Known advancing belt boot ends comprise a unit mounted on crawler tracks (or other traction system) and in order to laterally relocate the unit, it is necessary to skid steer (or otherwise) the unit using a forward/reverse motion.

OBJECT OF THE INVENTION

It is the object of the present invention to provide a belt conveyor advancing and/or retreating return end having the capability of moving the alignment of the belt sideways or rotate the belt alignment in a nominally horizontal plane without necessity of moving the belt return end either forward or rearward in the longitudinal direction of the belt.

DISCLOSURE OF THE INVENTION

There is disclosed herein a belt conveyor advancing and/or retreating return end comprising:
 a crawler frame,
 ground engaging traction means mounted to the crawler frame,
 a main frame supported by the crawler frame,
 means to support a conveyor end on the main frame, and
 slewing means connecting the crawler frame to the main frame to effect lateral/pivotal movement of the main frame relative to the crawler frame in a nominally horizontal plane.

Preferably, ground engaging lifting means are attached to the main frame to lift the main frame and crawler frame above a ground surface.

Preferably, the levelling means are provided between the crawler frame and the main frame to effect vertical plane pivoting of the main frame with respect to the traction means.

BRIEF DESCRIPTION OF THE DRAWINGS

A preferred form of the present invention will now be described by way of example with reference to the accompanying drawings, wherein:

FIG. 1 is a schematic side elevational view of a conveyor advancing and/or retreating return end connected to a conveyor structure and located adjacent to a mining excavation apparatus, FIG. 2 is a schematic sectioned side elevational view of a belt conveyor advancing and/or retreating return end frame.

DESCRIPTION OF THE PREFERRED EMBODIMENT

Figure 3A:
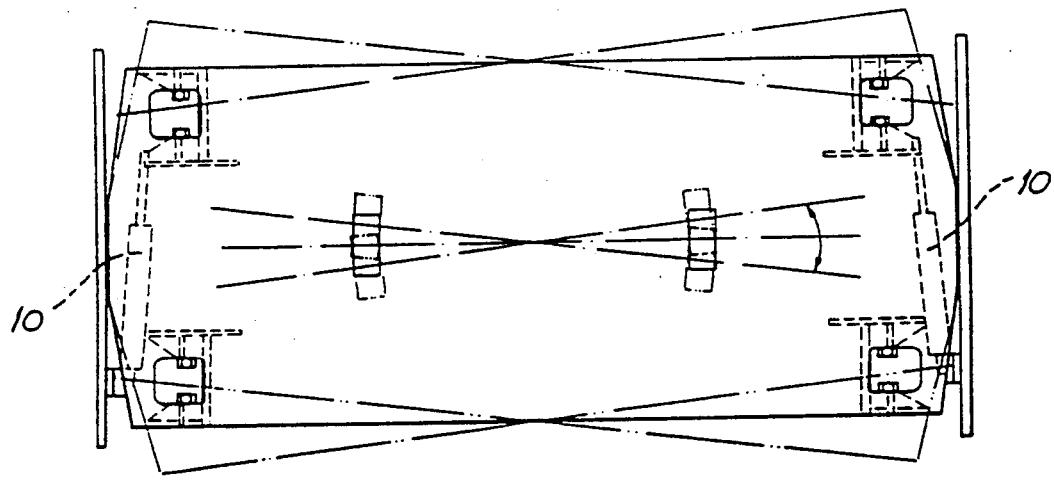
FIGS. 3(a) to 3(f) are schematic plan, end and side elevational views of the return end of FIG. 2 in various stages of operation.
Figure 3B:
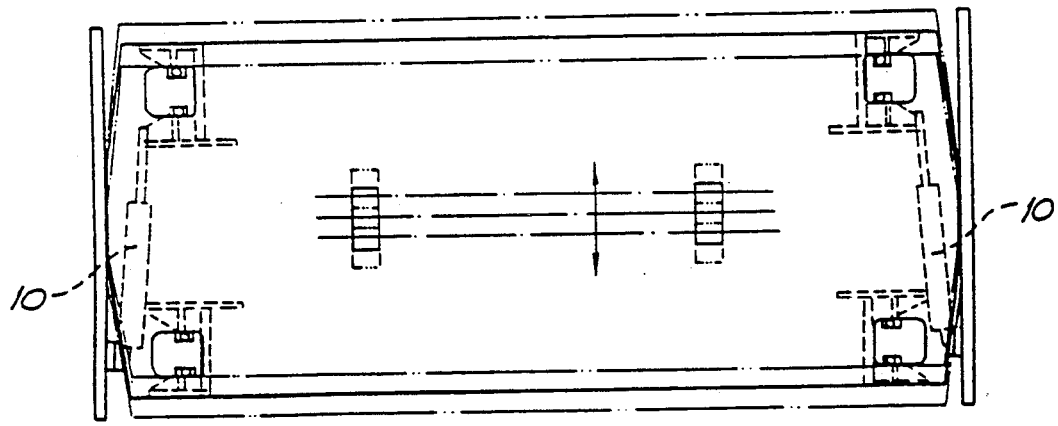
Figure 3C:
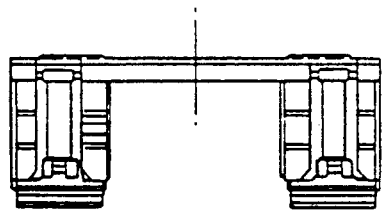
Figure 3D:
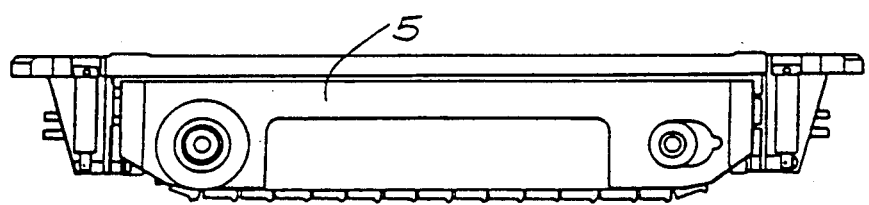
Figure 3E:
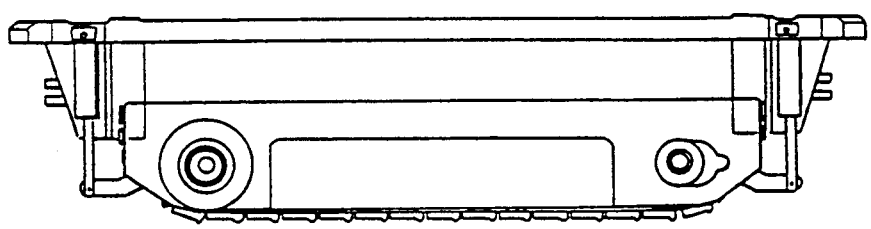
Figure 3F:
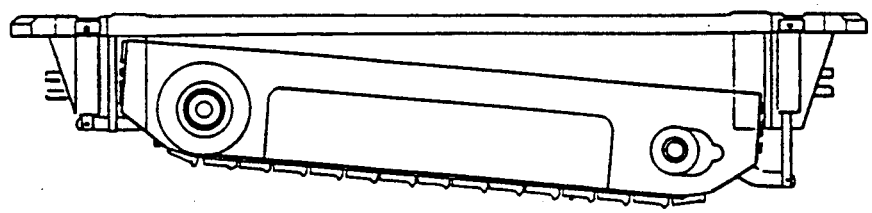
Figure 4:
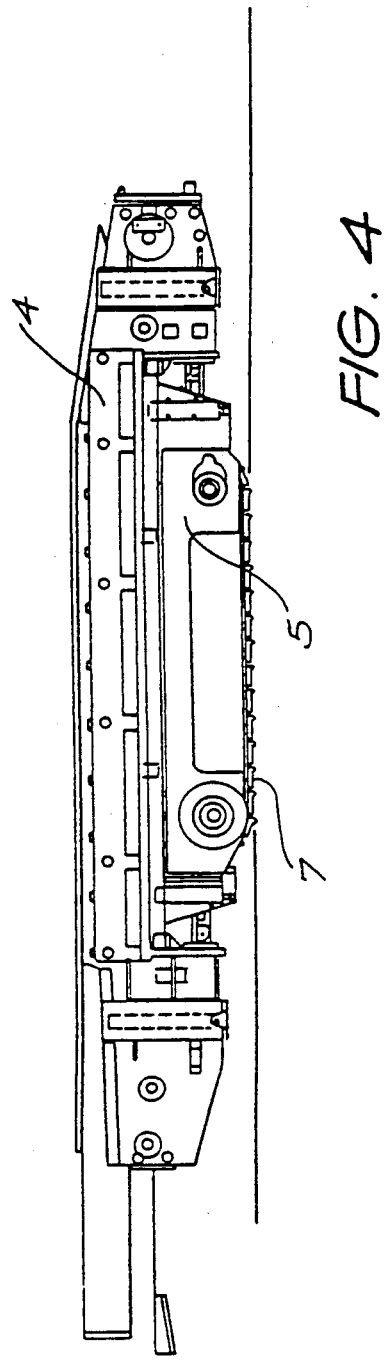
FIG. 4 is a schematic side elevational view of the return end of FIG. 2.
Figure 5:
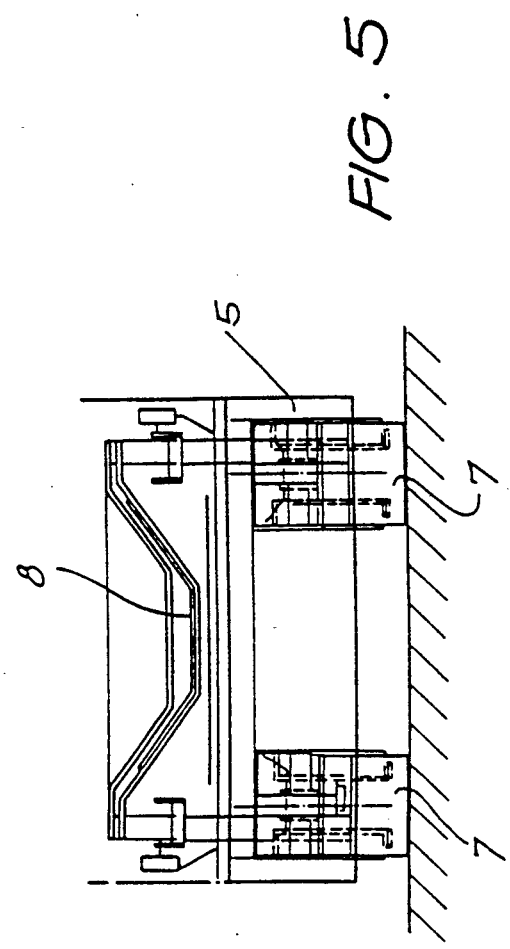
FIG. 5 is a schematic end elevational view of the return end.

In FIG. 1 of the accompanying drawings there is schematically depicted a belt conveyor advancing and/or retreating return end 1 situated between a conveyor structure 2 and an excavation implement 3. Elements 1, 2 and 3 are located in an underground mine 12. A conveyor belt 8 can be seen traversing the conveyor structure 2.

Return end 1 comprises a main frame 4 located above a crawler frame 5. Crawler mounts 6 as best shown in FIG. 2 serve as a means by which the crawler is located in the crawler frame 5.

Tracks 7 are mounted to crawler frame 5 in a conventional manner by items 6 and 11, that is a pair of tracks 7 are located in a parallel configuration at laterally opposing sides of crawler frame 5.

Turning now to FIGS. 3(a) to 3(f) and FIG. 7, it can be seen that slewing cylinders 10 are provided such that one end of each slewing cylinder 10 is connected to the main frame 4 whereas the other end is connected to the crawler frame 5. In the preferred embodiment respective slewing cylinders 10 are located at longitudinally opposing ends of crawler frame 5.

Figure 7:
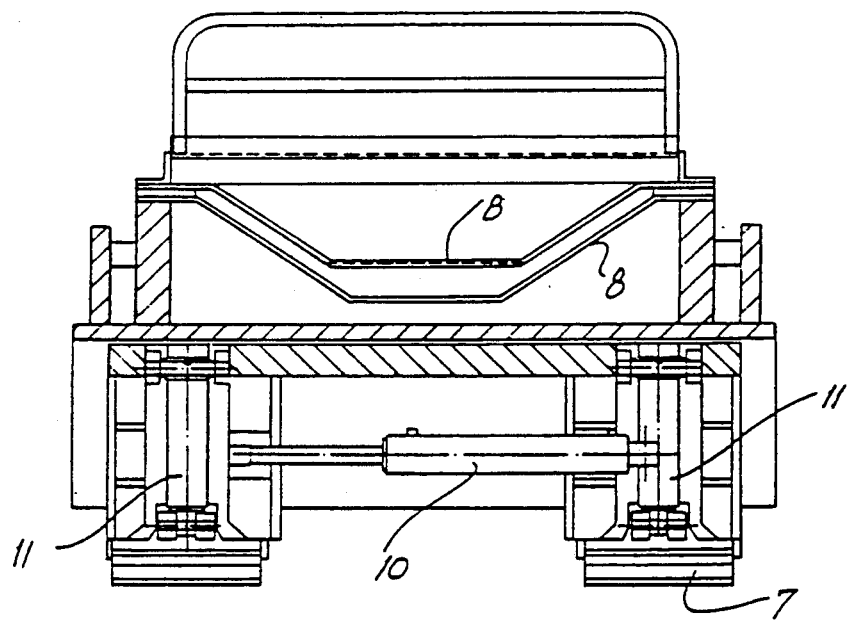
FIG. 7 is a schematic end elevational view of the return end depicted in FIG. 6.

A number of levelling cylinders 11 as best depicted in FIG. 7 are provided so as to effect vertical movement of crawler tracks 7 relative to crawler frame 5 which in turn effects vertical movement of the main frame 4. In the preferred embodiment, four such levelling cylinders are provided.

Figure 8:
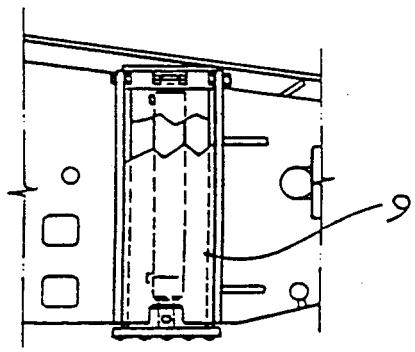
FIG. 8 is a schematic elevational view of a ground engaging stab jack.
Figure 9:
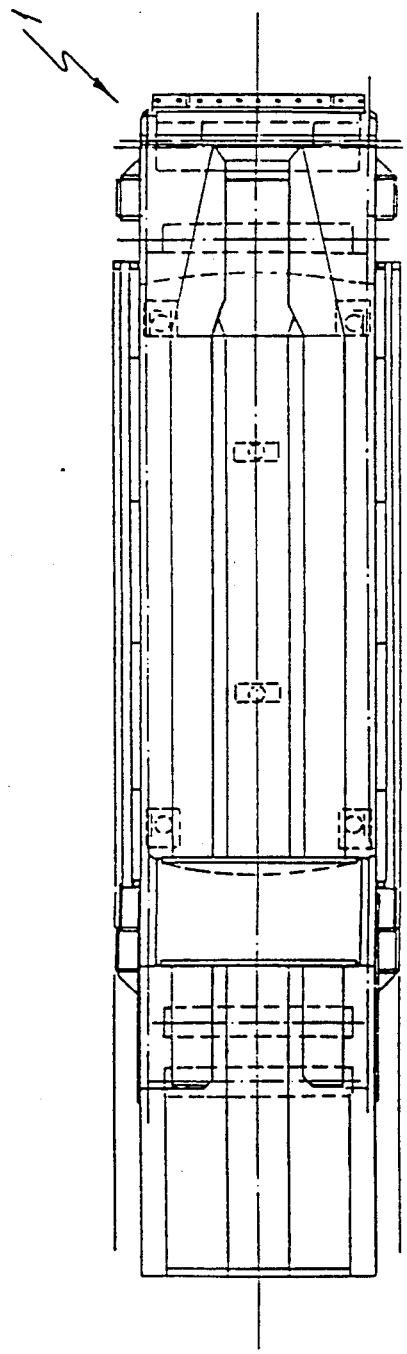
FIG. 9 is a schematic plan view of the return end of FIG. 2.
Figure 10:
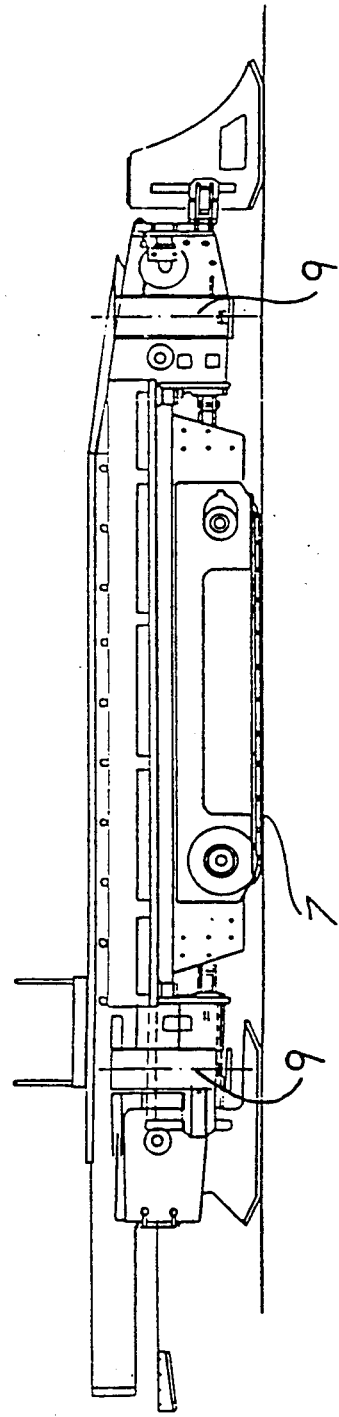
FIG. 10 is a further schematic side elevational view of the return end.

A number of stab jacks 9 as best depicted in FIG. 8 and FIG. 10 are attached to main frame 4. In the preferred embodiment, four such stab jacks 9 are provided, one being located in each corner of main frame 4.

Figure 6:
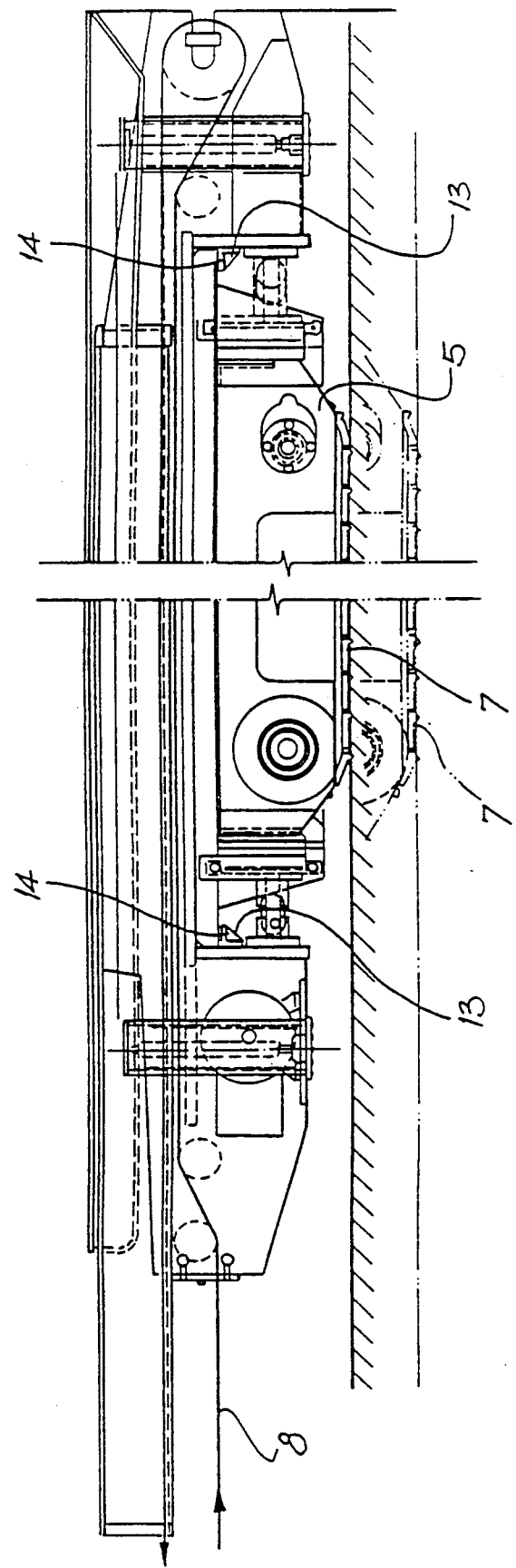
FIG. 6 is a schematic side elevational view of the return end of FIG. 2 showing a conveyor belt passing thereover.

Crawler frame support brackets 13, as best depicted in FIG. 6, are attached to main frame 4. Support brackets 13 comprise an upper ledge 14 to bear the weight of crawler frame 5.

In use, the return end 1 may be conventionally skid steered into position adjacent to the excavation implement 3. Although this is not the preferred method of locating return end 1 laterally it is nevertheless a possibility.

More preferably, the return end 1 will be located longitudinally with respect to the direction of belt 8 to a location which is approximately laterally square with excavation implement 3.

Stab jacks 9 may be actuated so as to raise main frame 4 above ground level. As crawler frame support brackets 13 are attached to main frame 4, when main frame 4 is lifted by the action of stab jacks 9, the crawler frame which is resting upon ledge 14 is also lifted above the ground surface. When clear of the ground surface both slewing cylinders 10 may be activated so as to laterally relocate crawler frame 5 relative to main frame 4. Once relocated, stab jacks 9 may be retracted so as to no longer support the weight of return end 1. At this point, slewing cylinders 10 may be reactivated so as to slide main frame 4 laterally across crawler frame 5 at which point, stab jacks 9 may be reactivated so as to continue in a stepwise fashion.

It should be appreciated that the angular orientation of main frame 4 with respect to the excavation implement 3 may be adjusted by way of slewing cylinders 10 either both or singularly operated.

At any stage the main frame 4 may not be level at which point levelling cylinders 11 may be activated so as to rectify this problem.

It should be appreciated that modifications and alterations obvious to those skilled in the art are not to be considered as beyond the scope of the present invention. For example, slewing cylinders 10 may be replaced by rack and pinion assemblies for example. Furthermore, it should be appreciated that crawler tracks 7 are merely a feature of the preferred embodiment. As an alternative, wheels having pneumatic tires or any other form of traction system are envisaged.

I claim:
1. A belt conveyor advancing and/or retrating return end comprising:
   a crawler frame;
   ground engaging traction means mounted to the crawler frame;
   a main frame supported by the crawler frame, with the main frame having a conveyor end support for supporting a conveyor end on the main frame: and
   a pair of slewing means, one located at each longitudinal opposing end of the crawler frame and connecting the crawler frame to the main frame to effect lateral/pivotal movement of the main frame relative to the crawler frame in a nominally horizontal plane.

2. The return end as claimed in claim 1 further comprising ground engaging lifting means attached to the main frame to lift the main frame and crawler frame above a ground surface.

3. The return end of claim 1 or claim 2 further comprising levelling means provided between the crawler frame and the main frame to effect vertical plane pivoting of the main frame with respect to the traction means.

4. The return end of claim 1 wherein the slewing means comprises hydraulic cylinders.

5. The return end of claim 4 wherein the hydraulic cylinder attached to the crawler frame at one longitudinal end thereof is attached to the crawler frame at a first lateral side thereof, whereas the other cylinder at the other lateral end of the crawler frame is attached to the crawler frame at a laterally opposing side thereof.

6. The return end of claim 2 wherein the lifting means comprises a hydraulic cylinder located at each corner of the main frame.

7. The return end of claim 3 wherein the levelling means comprise hydraulic cylinders.

8. The return end of claim 7 wherein four levelling means hydraulic cylinders are provided, one at each corner of the crawler frame.

9. The return end of claim 1 further comprising support brackets attached to the crawler frame at each corner thereof to support the main frame.

* * * * *